(12) United States Patent
Haukka et al.

(10) Patent No.: US 7,908,484 B2
(45) Date of Patent: Mar. 15, 2011

(54) METHOD OF PROTECTING DIGEST AUTHENTICATION AND KEY AGREEMENT (AKA) AGAINST MAN-IN-THE-MIDDLE (MITM) ATTACK

(75) Inventors: Tao Haukka, Oulu (FI); Aki Niemi, Helsinki (FI)

(73) Assignee: Nokia Corporation, Espoo (FI)

( * ) Notice: Subject to any disclaimer, the term of this patent is extended or adjusted under 35 U.S.C. 154(b) by 1183 days.

(21) Appl. No.: 10/920,845

(22) Filed: Aug. 18, 2004

(65) Prior Publication Data

US 2005/0044365 A1 Feb. 24, 2005

Related U.S. Application Data

(60) Provisional application No. 60/497,435, filed on Aug. 22, 2003.

(51) Int. Cl.
*H04L 9/32* (2006.01)
(52) U.S. Cl. ............... 713/181; 713/171; 726/4; 380/28
(58) Field of Classification Search ................... 713/171, 713/201; 726/4; 380/28
See application file for complete search history.

(56) References Cited

U.S. PATENT DOCUMENTS

| | | | | |
|---|---|---|---|---|
| 6,373,949 | B1 * | 4/2002 | Aura | 380/247 |
| 6,918,034 | B1 * | 7/2005 | Sengodan et al. | 713/160 |
| 7,131,006 | B1 * | 10/2006 | Carroll | 713/171 |
| 7,177,421 | B2 * | 2/2007 | Buer et al. | 380/28 |
| 2004/0187024 | A1 * | 9/2004 | Briscoe et al. | 713/201 |
| 2004/0210756 | A1 * | 10/2004 | Mowers et al. | 713/168 |
| 2004/0249974 | A1 * | 12/2004 | Alkhatib et al. | 709/245 |
| 2005/0022020 | A1 * | 1/2005 | Fremberg | 713/201 |

OTHER PUBLICATIONS

"PPP Extensible Authentication Protocol (EAP)", L. Blunk et al., IETF 2284, Mar. 1998, pp. 1-15.
"Microsoft Vendor-specific RADIUS Attributes", G. Zorn, IETF 2548, Mar. 1999, pp. 1-36.
"Hypertext Transfer Protocol (HTTP) Digest Authentication Using Authentication and Key Agreement (AKA)", A. Niemi et al., IETF 3310, Sep. 2002, pp. 1-16.
"HTTP Authentication Basic and Digest Access Authentication", J. Franks et al., IETF 2617, Jun. 1999, pp. 1-31.
"HMAC: Keyed-Hashing for Message Authentication", H. Krawczyk et al., IETF 2104, Feb. 1997, pp. 1-10.
"Hypertext Transfer Protocol (HTTP) Digest Authentication Using Authentication And Key Agreement (AKA) Version-2", V. Torvinen et al., Internet-Draft, Jun. 16, 2003, pp. 1-15.
"Man-in-the-Middle in Tunnelled Authentication Protocols", N. Asokan et al., CryptologyePrint Archive, http://eprint.iacr.org Report 2002/163, Oct. 2002, pp. 1-10.

* cited by examiner

*Primary Examiner* — Kambiz Zand
*Assistant Examiner* — Amare Tabor
(74) *Attorney, Agent, or Firm* — Harrington & Smith

(57) ABSTRACT

Disclosed is a method and system to discourage a MITM attacker in a data communications system that includes client and a server. The method includes, in a Digest Authentication and Key Agreement (AKA) challenge sent to the client from the server, setting an "algorithm" field to 'algorithm="AKAv1-HMAC-MD5"' for directing the client to use the HMAC-MD5 keyed hash function when producing Digest credentials; and using at least one of an AKA Integrity Key (IK) or an AKA Cipher Key (CK) in the keyed hash function.

21 Claims, 4 Drawing Sheets

METHOD OF PROTECTING DIGEST AUTHENTICATION AND KEY AGREEMENT (AKA) AGAINST MAN-IN-THE-MIDDLE (MITM) ATTACK

This patent application claims priority under 35 U.S.C. §119(e) from Provisional Patent Application No. 60/497,435, filed Aug. 22, 2003, the disclosure of which is incorporated by reference herein in its entirety.

TECHNICAL FIELD

This invention relates generally to data communications network protocols and procedures and, more specifically, relates to authentication protocols and procedures.

BACKGROUND

Some or all of the following abbreviations can be found in this application and/or in documents referenced by this application.
3GPP Third Generation Partnership Project
AAA Authentication, Authorization, and Accounting
AKA Authentication and Key Agreement
AuC Authorization Center
AUTN Authentication Token
CK Cipher Key
EAP Extensible Authentication Protocol
GETCERT Internet draft "Client Certificate and Key Retrieval for IKE"
GMM GPRS Mobility Management
GPRS General Packet Radio Service
GSM Global System for Mobile Communication
HMAC Message Authentication Using Cryptographic Hash Functions
HTTP Hyper Text Transfer Protocol
HSS Home Subscriber Server
IETF Internet Engineering Task Force
IK Integrity Key
IKE Internet Key Exchange
IMS IP Multimedia Subsystem
IMSI International Mobile Subscriber Identity
IP Internet Protocol
IPsec Internet Protocol Security
ISAKMP Internet Security Association and Key Management Protocol
ISIM IP Multimedia Services Module (may be implemented using the USIM)
MITM Man-in-the-Middle, a type of attack on a tunneled authentication protocol
NAS Network Authentication Server
OWLAN Operator Wireless Local Area Network
PEAP Protected EAP Protocol
PIC A Pre-IKE Credential Provisioning Protocol
PPP Point-to-Point Protocol
pppext "Point-to-Point protocol extensions" working group
RADIUS Remote Authentication Dial In User Service
RAND Random Challenge, generated by the AuC using SQN
RAS Remote Authentication Server
RES Authentication Response generated by ISIM
SIM Subscriber Identity Module
SQN Sequence Number
TLS Transport Layer Security
TTLS Tunneled TLS
UMTS Universal Mobile Telecommunications System
USIM Universal Subscriber Identity Module
WLAN Wireless Local Area Network Authentication protocols are used in communication networks to enable one entity in the network to satisfy another entity of its capacity to be provided with a service, for example, the undertaking of a data transaction or the granting of access to a resource. As one example, if a user's mobile phone is to access an e-mail account on a remote server then the server may wish to authenticate the mobile phone so that it can be sure that it is making the contents of the account available to the correct entity. Similarly, the user of the mobile phone may desire that the mobile phone authenticate the server so that the user can be sure that data provided to the server is not being intercepted by a third party that is impersonating the server.

A number of authentication protocols have been developed. Examples include the EAP procedure, described in RFC 2284, that provides a standard mechanism for support of multiple authentication methods. Through the use of EAP, support for a number of authentication schemes maybe added, including smart cards, Kerberos, Public Key, One Time Passwords, and others. Specific EAP/SIM and EAP/AKA methods have been defined for the purposes of the OWLAN system, which makes use of the GSM or UMTS authentication methods for the authentication of WLAN access and derivation of link keys for the protection of the WLAN link.

EAP is a general authentication protocol, designed to allow end-points to use multiple forms of authentication. EAP does not require the server (typically a PPP or IEEE 802 end-point) to authenticate the client itself, rather it allows the server to proxy authentication messages to a back-end authentication server, and to inspect the packets to determine if the authentication was successful.

One of the goals of EAP is to enable the development of new authentication methods without requiring the deployment of new code on the local authentication server. As a result, the local server acts as a "passthrough", and need not understand specific EAP methods.

Since its deployment, a number of weaknesses in EAP have become apparent. These include a lack of protection of the user identity or the EAP negotiation, as well as no standardized mechanism for implementing a key exchange. For example, EAP/SIM and EAP/AKA solve these problems by making use of the specific features of SIM and USIM (AKA) authentication methods.

IETF working groups have designed three new protocols to develop standard solutions. Two of these protocols, PEAP and TTLS, originating from the pppext working group, are intended to solve the same problem as EAP/SIM and EAP/AKA, but independently of the specific EAP method. The idea in brief is to encapsulate the EAP protocol within TLS. The third protocol (PIC) is proposed to develop a unilateral version of the ISAKMP authentication and key derivation protocol, within which the EAP protocol is encapsulated. All three protocols include a method of managing secret parameters for further use. In PEAP and TTLS the keys are derived from the TLS master key, while in PIC the tunnel derived by simplified ISAKMP is used to transport security association from the local authentication server to the client.

By wrapping the EAP protocol within TLS, Protected EAP (PEAP) is said to provide user anonymity and built-in support for key exchange.

FIG. 1 shows the relationship between the EAP peer (client), the network authentication server (NAS) and the back-end authentication server. The EAP conversation "passes through" the NAS on its way between the client and the backend authentication server. While the authentication conversation is between the EAP peer and the backend authentication server, the NAS and the backend authentication server need to have established trust for the conversation to proceed.

In PEAP, the conversation between the EAP peer and the backend server is encrypted and integrity protected within a TLS channel, and mutual authentication is required between the EAP peer and the backend server.

As a result, the NAS does not have knowledge of the TLS master secret derived between the EAP Peer and the backend authentication server, and cannot decrypt the PEAP conversation. However, in order to provide keying material for link-layer ciphersuites the NAS does obtain the master session keys, which are derived from the TLS master secret via a one-way function.

Since EAP methods may not know the link layer ciphersuite that has been negotiated, it may not be possible for them to provide link layer ciphersuite-specific keys. In addition, attempting to provide such keys is undesirable, since it would require the EAP method to be revised each time a new link layer ciphersuite is developed. As a result, PEAP derives master session keys, which can subsequently be truncated for use with a particular link layer ciphersuite. PEAP does not discuss the format of the attributes used to communicate the master session keys from the backend authentication server to the NAS. However, examples of such attributes are provided in RFC 2548.

The operation of PEAP is as follows:
1. Establish TLS connection. The TLS record protocol provides a secure connection between the peer and the back-end authentication server
2. Authenticate TLS server. The TLS handshake protocol is used for server authentication
3. Authenticate user. The user of the peer authenticates by tunnelling another EAP mechanism (e.g. Generic Token Card) inside the EAP-TLS connection. The back-end authentication server may have to contact another server to have the user authentication information validated.
4. Generate session keys. Using the TLS Pseudo-Random Function (PRF), the peer and the back-end server generate key material for use between the NAS and the peer.
5. (Transport session keys). The session key is transported from the server to the authenticator using, e.g., RADIUS attributes and a secure connection.

In the internet draft, EAP SIM GMM Authentication, dated August 2002, by Adrian Buckley et al., an application of PEAP to GSM authentication is presented. The architectural overview of this EAP method using SIM is depicted in FIG. 2.

As can be seen in FIG. 3, the architectural view of EAP-TTLS is essentially the same as in PEAP. EAP-TTLS claims to allow legacy password-based authentication protocols to be used against existing authentication databases, while protecting the security of these legacy protocols against eavesdropping, man-in-the-middle and other cryptographic attacks.

EAP-TTLS also allows the client and server to establish keying material for use in the data connection between the client and access point. The keying material is established implicitly between the client and server based on the TLS handshake.

When record layer security is instantiated at the end of a TLS handshake, a pseudo-random function (PRF) is used to expand the negotiated master secret, server random value and client random value into a sequence of octets that is used as keying material for the record layer.

EAP-TTLS leverages this technique to create keying material for use in the data connection between client and access point. The same PRF is used to generate as much keying material as required, with the constant string set to "ttls keying material".

The PIC protocol is a method to bootstrap IPsec authentication via an "Authentication Server" (AS) and user authentication mechanisms (e.g., RADIUS). Referring to FIG. 4, the client machine communicates with the AS using a key exchange protocol where only the server is authenticated, and the derived keys are used to protect the user authentication. Once the user is authenticated, the client machine obtains credentials from the AS that can be later used to authenticate the client in a standard IKE exchange with an IPsec-enabled security gateway. The later stage does not require user intervention.

The PIC protocol realizes this approach and secures it using simplified ISAKMP and IKE mechanisms. The protocol embeds EAP messages (see RFC2284) in ISAKMP payloads to support multiple forms of user authentication. Once this user authentication succeeds, the client machine obtains from the AS credentials that can later be used by the client to perform regular IKE authentication with an IPsec-enabled gateway. PIC defines several forms of credentials and can be extended to support others. Note that this document uses the term "credentials" for both digital certificates and shared secret keys.

PIC requires no modification to IKE. Instead it uses simplified elements of ISAKMP and IKE to obtain a much less ambitious goal than general IKE, namely the secure provisioning of credentials for successfully authenticated users. The direct use of IKE, e.g., as compared to TLS tunneling, see GETCERT, reduces complexity and contributes to the efficiency of the protocol.

The PIC protocol is defined between the client and the AS. All other exchanges between the entities are implicit in the protocol. This applies in particular to user and machine authentication between the AS and the Back-End Authentication Server, and certification between the AS and the CA.

The four main stages of the proposed PIC protocol are:
1. An optional round of messages provides partial protection of the AS from denial-of-service attacks by verifying that the initiator of the exchange is reachable at the purported source IP address. This is done before any significant CPU or memory resources are consumed by the AS.
2. The protocol establishes a one-way authenticated channel from the client to the AS in which only the server is authenticated.
3. User authentication is performed over this secured channel. User authentication information is transported using EAP tunnelled within ISAKMP.
4. The AS sends the client a (typically short-term) credential, which can be used in subsequent IKE exchanges. This credential can be thought of as a certificate, or a private key generated or stored by the AS and accompanied by a corresponding certificate. It may also be a symmetric secret key, or other information for deriving such a key.

In stage 4 the created ISAKMP tunnel is used to obtain the secure provisioning of credentials for successfully authenticated users.

Another alternative proposal is HTTP digest authentication within a TLS tunnel, which is not described in detail herein.

It should be noted that the network entity referred to as the "back-end server" in the description of PEAP, see FIG. 1, does not have the same role in the authentication protocol as the back-end server in PIC. The PEAP back-end server is referred to as the EAP Server in FIG. 2, and its role is essentially the same as that of the TTLS AAA server of EAP-TTLS (FIG. 3) and the AS of PIC (FIG. 4).

The foregoing prior proposals all utilize an inner client (or mutual) authentication protocol within a secure tunnel that is constructed using a session key resulting from an outer server authentication protocol. In the following description EAP/AKA is used as an example of the inner protocol, however the general points of the discussion are applicable to any pair of authentication protocols used in the above manner. This is convenient since the EAP/AKA protocol is to be implemented by the USIM of 3G mobile stations, and thus this protocol is readily available to a terminal that is to be authenticated.

EAP/AKA is a challenge-response protocol. In the protocol the "responding entity" that is to be authenticated shares a secret key with the "challenging entity" that is to verify its authenticity. The challenging entity issues to the responding entity a challenge message which includes challenge data, which is typically randomly generated data. The responding entity then generates response data by applying a known function to that challenge data and to the secret key. The response data is returned to the challenging entity in a response message. The challenging entity can also apply the known function to the challenge data and the key, and the result of that can be compared to the response data. Only if the two match is the responding entity authenticated. In the above described prior proposals the authentication method of AKA is to be used in just the same way as in its pre-existing applications: i.e. the terminal is supplied with challenge data to which it is to apply the function, and it then returns the result to the network for authentication. However, the key agreement part of UMTS AKA is not used.

In place of the EAP encapsulated AKA protocol, any EAP type protocol can be used for authentication of the terminal to the network.

FIG. 5 illustrates a logical architecture that is common to all of the above described prior authentication protocol proposals. First, a stage-one authentication exchange 40 takes place. In that exchange the identity of a back-end server 41 is authenticated to a terminal entity 42. However, the identity of the terminal entity is not authenticated to the back-end server. Then a stage-two authentication exchange 43 takes place, in which it is intended that the terminal entity is authenticated to the back-end server. Since each of the prior proposals is intended to be compatible with existing terminal entities, the existing authentication protocol (e.g. EAP/AKA), which has hitherto been usable as a stand-alone protocol, is used for the essential authentication part of stage two. In stage two the back-end server issues a challenge 44 to the terminal entity. The challenge is of such a type that the back-end server can (either by itself or through referral to a further authentication server) authenticate the terminal entity by means of its response to the challenge. The terminal entity processes the challenge and formulates its response (step 45) and returns that response to the back-end server (step 46). The back-end server checks the response (or refers it for checking) (step 47). If the response is correct then the back-end server has authenticated the terminal entity and can issue it with credentials, e.g., session keys that allow it to carry out subsequent secure transactions with the server (step 48). Otherwise no such credentials are issued and the terminal entity cannot carry out such transactions.

Some of the stage-two protocols have both an authentication function and a key-agreement function. In existing proposals the key-agreement function of the stage-two protocol is not used. Instead, the session keys are derived using the key-agreement function of the stage-one authentication protocol.

It was traditionally assumed that the above-described prior proposals provide for secure authentication of both the back-end server and the terminal entity to each other. However, it has been realized that this is not the case.

The vulnerability of the above-described prior proposals will be described with reference to FIG. 6. In FIG. 6 like items are numbered as in FIG. 5. In FIG. 6 a "man-in-the-middle" (MITM) attacker 49, who intends to impersonate a terminal entity 42, takes the place of the terminal entity in FIG. 5. The MITM attacker 49 performs the stage-one authentication with the back-end server. Then during the stage-two authentication, when the MITM attacker 49 receives the challenge message (step 44) from the back-end server it forwards it on to the terminal entity 42 (Step 50). Using the pre-existing AKA protocol, the terminal entity 42 returns the appropriate response to the MITM attacker 49 (Step 51). Then the MITM attacker 49 forwards that response to the back-end server (step 46). Since the response is the correct response for authentication of the terminal entity 42 the back-end server authenticates the MITM attacker 49 as the terminal entity 42 (step 47) and issues it credentials accordingly (step 48). The result is that this may allow the MITM attacker 49 access to supposedly secure services by impersonating the identity of terminal entity 42.

Reference can be made to Asokan, N., Niemi, V. and K. Nyberg, "Man-in-the-Middle in Tunnelled Authentication Protocols", Cryptology ePrint Archive, The Cryptology ePrint Archive Report 2002/163, October 2002, for a detailed discussion of the MITM-type of attack.

The various proposals described above have been developed with the aim of using the existing challenge-response protocol for the essential authentication part of stage two, since the challenge-response protocol is already a feature of the terminals that are to use the system. However, and as was made evident above, these prior authentication protocols can fail to provide adequate security.

A problem of particular interest to this invention relates to the 3GPP IP Multimedia Subsystem, Release 5 and Release 6, functionality to authenticate User Equipment. The Release 5 and Release 6 services rely on the Digest AKA (IETF RFC 3310) for authentication. The Digest AKA specification defines a procedure to authenticate an endpoint using shared secrets and a cryptographic hash to produce credentials from a server-generated challenge. The password used in this process is based on the UMTS AKA cryptographic parameter RES.

However, in certain cases the Digest AKA is vulnerable to the tunneled MITM attack. In this attack, a malicious third party masquerades as the Digest AKA client over a secure transport channel to receive a challenge from the server. It then masquerades as a server to the actual Digest AKA client and forwards the received challenge to the actual Digest AKA client. The credentials received from the actual Digest AKA client are then sent to the actual Digest AKA server over the secure connection, allowing for the malicious third party to gain access to the resources of the masqueraded client.

In essence, the problem is based on the fact that the same set of credentials can be used in two different contexts, and that there is no way to distinguish between them.

Commonly assigned International Application PCT/IB02/05195 describes a method for authenticating a terminal in a communication system, where the terminal includes an identification means for applying authentication functions to input data to form response data, and the communication system is arranged to utilize a first authentication protocol for authentication of the terminal. The authentication functionality and the terminal share challenge data, and the terminal forms response data and a first key by applying the authentication functions to the challenge data using the identification means, and returns the response data to the authentication functionality. The authentication functionality authenticates the terminal by means of the response data and can apply an authentication function to the challenge data to duplicate the first key. The method includes executing a second authentication protocol wherein the terminal authenticates the identity of a network entity, and the terminal and the network entity share a second key for use in securing subsequent communications between the terminal and the network entity. A third authentication protocol is subsequently executed by: sharing challenge data between the network entity and the terminal; forming at the terminal a test data by at least applying one of the authentication functions to the challenge data by means of the identification means; transmitting a message comprising terminal authentication data, from the terminal to the network entity; and determining, based on the terminal authentication data, whether to provide the terminal with access to a service. In the determining step the terminal is provided with access to the service only if the terminal authentication data equals a predetermined function of at least the test data and the second key.

While the foregoing procedure is well suited for many applications, it would be desirable to provide an even more secure technique to thwart a MITM attacker, such as in the Digest AKA scenario.

It has been recently proposed to create a new version of Digest AKA, namely Digest AKAv2, Hypertext Transfer Protocol (HTTP) Digest Authentication Using Authentication and Key Agreement (AKA) Version-2, V. Torvinen and J. Arkko, sixteen pages, dated Jun. 16, 2003, also referred to herein as the AKAv2 draft). In this proposal a change is made to the way that the password in Digest AKA is generated, by including also the AKA sessions keys IK and CK in the Digest procedure as a "password".

However, there are problems with this proposal, as will be discussed below.

SUMMARY OF THE PREFERRED EMBODIMENTS

The foregoing and other problems are overcome, and other advantages are realized, in accordance with the presently preferred embodiments of this invention.

This invention provides, in one aspect thereof for use in an IP Multimedia Subsystem, a method to authenticate User Equipment using a Digest Authentication and Key Agreement (AKA) authentication procedure. The method uses an Authentication Response (RES) parameter in combination with an AKA session key selected from at least one of an AKA Integrity Key (IK) or an AKA Cipher Key (CK).

Also disclosed is a method to discourage a MITM attacker in a data communications system that includes a client and a server. The method includes, in a Digest Authentication and Key Agreement (AKA) challenge sent to the client from the server, setting an "algorithm" field to 'algorithm="AKAv1-HMAC-MD5"' for directing the client to use the HMAC-MD5 keyed hash function when producing Digest credentials; and using at least one of an AKA Integrity Key (IK) or an AKA Cipher Key (CK) in the keyed hash function. When using IK, the HMAC-MD5 hash for the Digest AKA is as follows:

HMAC-MD5(data)=MD5(IK XOR opad, MD5(IK XOR ipad, data)), while when using CK, the HMAC-MD5 hash for the Digest AKA is as follows:

HMAC-MD5(data)=MD5(CK XOR opad, MD5(CK XOR ipad, data)).

The result is that the Digest is defined as:

Digest=HMAC-MD5(concat.(HMAC-MD5(A1),nonces, HMAC-MD5(A2))).

In a further method to discourage the MITM attacker, in a Digest AKA challenge sent to the client from the server, setting the "algorithm" field to indicate an algorithm="AKAv2-HMAC-MD5" or "AKAv1-HMAC-MD5", where in AKAv2 a value A1' is defined as follows:

Let A1'=K∥opad∥MD5(K∥ipad∥A1), so that A1' is the contents of the HMAC part, and the result is:

$$\text{Digest} = MD5(concat \cdot (MD5(A1'), nonces, MD5(A2)))$$
$$= MD5(concat \cdot (HMAC - MD5(A1), nonces, MD5(A2))),$$

where K is composed of an AKA Integrity Key (IK), an AKA Cipher Key (CK), a concatenation of IK and CK, or a cryptographic combination of IK and CK.

Note that in this method the directive may be defined as 'algorithm="AKAv2-HMAC-MD5"'or as 'algorithm="AKAv1-HMAC-MD5"'.

Further aspects of this invention pertain to a system including a server and a client that operate in accordance with the foregoing methods, as well as to the server and to the client, per se.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 1 shows the relationship between an EAP client, a backend authentication server and a NAS in PEAP;

FIG. 2 depicts an architectural overview of EAP SIM GMM authentication;

FIG. 3 depicts a network architectural model for EAP-TTLS;

FIG. 4 illustrates relations between PIC entities;

FIG. 5 shows the logical operation of the prior authentication protocols;

FIG. 6 illustrates message flow during a MITM attack; and

DETAILED DESCRIPTION OF THE PREFERRED EMBODIMENTS

Figure 1:
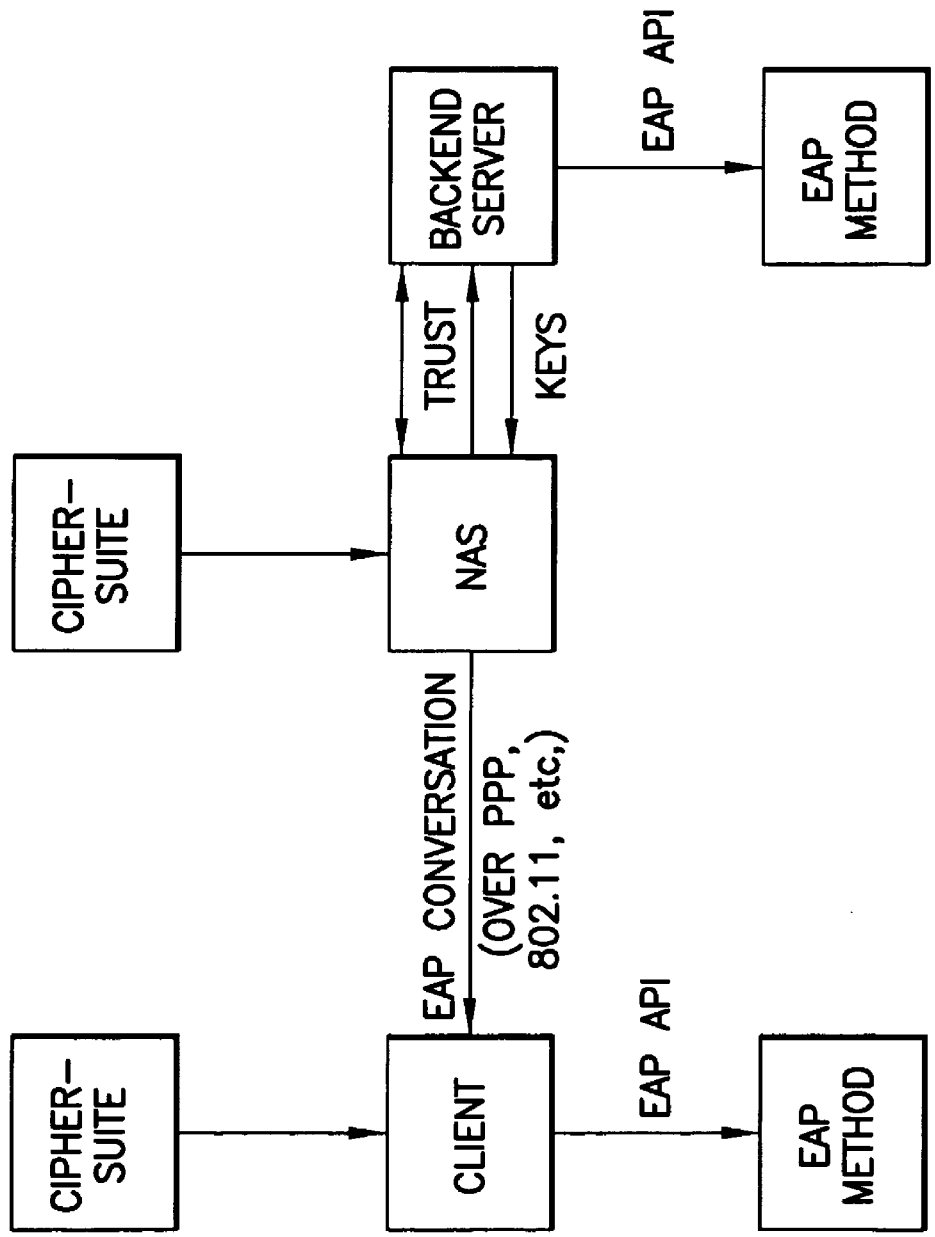
FIGS. 1-6 are illustrative of the prior authentication proposals, where in more detail.

Reference can be had to the Appendices A (RFC 2104, Krawczyk et al., February 1997), B (RFC 2617, Franks et al. June 1999) and C(RFC 3310, Niemi et al., September 2002) of the Provisional Patent Application No. 60/497,435, filed Aug. 22, 2003, referred to above, for their teachings of methods that are combined, modified and improved upon in accordance with this invention.

This invention provides an improved authentication protocol that solves the Digest AKA-related MITM attack problem by defining a new Digest AKA algorithm. In the preferred embodiment the new Digest AKA algorithm employs, in combination, aspects of the HMAC specification, (RFC 2104, Krawczyk et al., February 1997) and one of the AKA cryptographic parameters, IK (Integrity key) or CK (cipher key). In operation, the method authenticates the client using both the RES parameter and one of the session keys (IK or CK) produced by AKA.

From the definition of HMAC given in RFC 2104, HMAC requires a cryptographic hash function, denoted by H, and a secret key, denoted by K. H is assumed to be a cryptographic hash function where data is hashed by iterating a basic compression function on blocks of data. B denotes the byte-length of such blocks (B=64 for examples of hash functions mentioned in RFC 2104, e.g., MD5 and SHA-1), and L denotes the byte-length of hash outputs (L=16 for MD5, L=20 for SHA-1). The authentication key K can be of any length up to B, the block length of the hash function. Applications that use keys longer than B bytes first hash the key using H and then use the resultant L byte string as the actual key to HMAC. The minimal recommended length for K is L bytes (as the hash output length).

Two fixed and different strings "ipad" (inner padding) and "opad" (outer padding) are defined as follows:
ipad=the byte 0×36 repeated B times
opad=the byte 0×5C repeated B times.
To compute HMAC over the data 'text' one performs:
H(K XOR opad, H(K XOR ipad, text))
That is, one proceeds to:
(1) append zeros to the end of K to create a B byte string (e.g., if K is of length 20 bytes and B=64, then K will be appended with 44 zero bytes 0×00);
(2) XOR (bitwise exclusive-OR) the B byte string computed in step (1) with ipad;
(3) append the stream of data 'text' to the B byte string resulting from step (2);
(4) apply H to the stream generated in step (3);
(5) XOR (bitwise exclusive-OR) the B byte string computed in step (1) with opad;
(6) append the H result from step (4) to the B byte string resulting from step (5); and
(7) apply H to the stream generated in step (6) and output the result.

The key for HMAC is defined to be of any length. Keys longer than B bytes are first hashed using H, while the use of less than L bytes is discouraged as it would decrease the security strength of the function. The keys are said should be chosen at random (or using a cryptographically strong pseudo-random generator seeded with a random seed), and periodically refreshed.

HMAC is defined in RFC 2104 in such a way that the underlying hash function H can be used with no modification to its code. In particular, it uses the function H with the pre-defined initial value IV, which is a fixed value specified by each iterative hash function to initialize its compression function. However, and if desired, it is said that a performance improvement can be achieved at the cost of (possibly) modifying the code of H to support variable IVs.

It is further stated in RFC 2104 that the intermediate results of the compression function on the B-byte blocks (K XOR ipad) and (K XOR opad) can be precomputed only once at the time of generation of the key K, or before its first use. These intermediate results are stored and then used to initialize the IV of H each time that a message needs to be authenticated. This method saves, for each authenticated message, the application of the compression function of H on two B-byte blocks (i.e., on (K XOR ipad) and (K XOR opad)).

The Digest currently supports MD5 as the hash function (MD5 is an iterative cryptographic hash function), and has extensibility to support other hash algorithms. The hash function used in the Digest is defined in RFC 2617 (Franks et al. June 1999), with the following notations:
H(data)=MD5(data)
KD(secret, data)=H(concat(secret, ":", data)).
Note that RFC 2617 discusses the MITM attack problem in Section 4.8.

In accordance with a first method of this invention, HMAC-MD5 is used to replace every MD5 in the Digest. However, it should be appreciated that the use of other HMAC-xxx algorithms is within the scope of this invention, such as HMAC-SHA-1 and others. By defining the new hash algorithm, e.g., HMAC-MD5, for the Digest, the first notation becomes (the latter notation is not affected):
H(data)=HMAC-MD5(data)=MD5(key XOR opad, MD5 (key XOR ipad, data)).

It should be noted that "ipad" (inner padding) and "opad" (outer padding) are preferably as defined in RFC 2104 in the function definition for hmac_md5, i.e.:

```
/*
** Function: hmac_md5
*/
void
hmac_md5(text,text_len, key, key_len, digest)
unsigned char* text;    /*pointer to data stream */
int   text_len;   /* length of data stream */
unsigned char* key;    /* pointer to authentication key */
int key_len;    /* length of authentication key */
caddr_t digest; /* caller digest to be filled in */
{
    MD5_CTX context;
    unsigned char k_ipad[65]; /* inner padding -
              * key XORd with ipad
              */
    unsigned char k_opad[65]; /* outer padding -
              * key XORd with opad
              */
    unsigned char tk[16];
    int i;
    /* if key is longer than 64 bytes reset it to key=MD5(key) */
    if (key_len > 64) {
        MD5_CTX tctx;
        MD5Init(&tctx);
        MD5Update(&tctx, key, key_len);
        MD5Final(tk, &tctx);
        key = tk;
        key_len = 16;
    }
    /*
     * the HMAC_MD5 transform looks like:
     *
     * MD5(K XOR opad, MD5(K XOR ipad, text))
     *
     * where K is an n byte key
     * ipad is the byte 0x36 repeated 64 times
     * opad is the byte 0x5c repeated 64 times
     * and text is the data being protected
     */
    /* start out by storing key in pads */
    bzero( k_ipad, sizeof k_ipad);
    bzero( k_opad, sizeof k_opad);
    bcopy( key, k_ipad, key_len);
    bcopy( key, k_opad, key_len);
    /* XOR key with ipad and opad values */
    for (i=0; i<64; i++) {
        k_ipad[i] ^= 0x36;
        k_opad[i] ^= 0x5c;
    }
    /*
     * perform inner MD5
     */
```

-continued

```
    MD5Init(&context);    /* init context for 1st
            * pass */
    MD5Update(&context, k_ipad, 64) /* start with inner pad */
    MD5Update(&context, text, text_len); /* then text of datagram */
    MD5Final(digest, &context);    /* finish up 1st pass */
    /*
     * perform outer MD5
     */
    MD5Init(&context); /* init context for 2nd
            * pass */
    MD5Update(&context, k_opad, 64); /* start with outer pad */
    MD5Update(&context, digest, 16); /* then results of 1st
            * hash */
    MD5Final(digest, &context); /* finish up 2nd pass */
}
```

In accordance with a preferred embodiment of this invention, in the Digest AKA challenge (see RFC 3310, Niemi et al., September 2002) the "algorithm" field is set to 'algorithm="AKAv1-HMAC-MD5"', so that the client is directed to use the keyed hash when producing the Digest credentials, as opposed to the conventional MD5 algorithm. As is defined in RFC 3310, in order to direct the client into using AKA for authentication instead of the standard password system, the RFC 2617 defined algorithm directive is overloaded in Digest AKA:
algorithm="algorithm" EQUAL (aka-namespace/algorithm-value)
aka-namespace=aka-version "-" algorithm-value
aka-version="AKAv" 1*DIGIT
algorithm-value=("MD5"/"MD5-sess"/token)

In RFC 3310 "algorithm" is defined to be a string indicating the algorithm used in producing the Digest and the checksum. If the directive is not understood, the nonce is ignored, and another challenge (if one is present) is used instead. The default aka-version is "AKAv1". Further AKA versions can be specified. When the algorithm directive is not present, it is assumed to be "MD5". This indicates that AKA is not used to produce the Digest password.

Setting the "algorithm" field to 'algorithm="AKAv1-HMAC-MD5"', in accordance with an aspect of this invention, is in contrast to the prior proposals, where the field would be set instead to 'algorithm="AKAv2-MD5"', thereby indicating a completely new AKA version.

Further in accordance with this invention, and in that the HMAC-MD5 is a keyed hash, an appropriate key is provided. The appropriate key may be either the AKA IK, or CK. For example, using IK, the HMAC-MD5 hash for the Digest appears as:
HMAC-MD5(data)=MD5(IK XOR opad, MD5(IK XOR ipad, data)).

Eventually the Digest is defined as follows:
Digest=HMAC-MD5(concat.(HMAC-MD5(A1),nonces, HMAC-MD5(A2))).

The remainder of the Digest calculations are unaffected. In particular, the Digest AKA procedure is unaffected, which is a significant advantage over the prior authentication proposals.

In a further embodiment of this invention the Digest is generated as follows:
HMAC-MD5(concat.(MD5(A1),nonces,MD5(A2))).

This embodiment also affects the Digest, but only the Digest, and there is no need to generate a specification of AKAv2.

In a second embodiment of a method in accordance with this invention, there is defined in AKAv2 a new value A1' as follows:

Let A1'=IK||opad||MD5(IK||ipad||A1),
so that A1' forms the contents of the HMAC part, and the result is:

$$\text{Digest} = MD5(concat \cdot (MD5(A1'), nonces, MD5(A2)))$$

$$= MD5(concat \cdot (HMAC - MD5(A1), nonces, MD5(A2))).$$

The approach does not affect the Digest defined by RFC 2617 (Appendix B), but affects only a new version of AKAv2 where A1' is defined.

It should be noted that in the definition of A1' given above the cipher key CK could be used in place of IK, or a concatenation of IK and CK could be used (IK||CK), or a cryptographic combination of IK and CK could be used.

Figure 7:
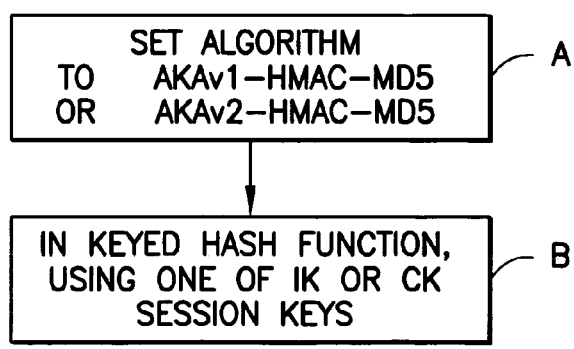
FIG. 7 illustrates a method in accordance with this invention.

Referring to FIG. 7, a method to discourage a MITM attacker in a data communications system that includes client and a server includes a Step A of, in a Digest Authentication and Key Agreement (AKA) challenge sent to the client from the server, setting an "algorithm" field to 'algorithm="AKAv1-HMAC-MD5"' for directing the client to use the HMAC-MD5 keyed hash function when producing Digest credentials; and (Step B) using an AKA Integrity Key (IK) or an AKA Cipher Key (CK) in the keyed hash function. When using IK, the HMAC-MD5 hash for the Digest AKA is as follows:
HMAC-MD5(data)=MD5(IK XOR opad, MD5(IK XOR ipad, data)),
while when using CK, the HMAC-MD5 hash for the Digest AKA is as follows:
HMAC-MD5(data)=MD5(CK XOR opad, MD5(CK XOR ipad, data)).

Note that FIG. 7 may also be viewed as a system level block diagram showing a server (block A) and a client, such as a user equipment, (block B) that operate in accordance with the preferred embodiments of this invention. The user equipment may communicate with the server via wireless communications channel, such as an RF channel, and may comprise a cellular telephone or some other type of wireless communications apparatus. The client and the server are each deemed to include at least one function, such as a programmed data processor, for implementing the methods in accordance with the embodiments of this invention. Examples of suitable user equipment include, but are not limited to, cellular telephones, personal digital assistants (PDAs), portable computers, image capture devices such as digital cameras, gaming devices, music storage and playback appliances, Internet appliances and handheld units or terminals that incorporate combinations of such functions, and that include a wireless communications capability.

In a further method to discourage the MITM attacker, in the Digest AKA challenge sent to the client from the server, the server sets the "algorithm" field in block A of FIG. 7 to indicate an algorithm="AKAv2-HMAC-MD5" or "AKAv1-HMAC-MD5", where in the preferred version of AKAv2 a value A1' is defined as follows:
Let A1'=IK||opad||MD5(IK||ipad||A1),
so that A1' is the contents of the HMAC part, and the result is:

$$\text{Digest} = MD5(concat \cdot (MD5(A1'), nonces, MD5(A2)))$$

$$= MD5(concat \cdot (HMAC - MD5(A1), nonces, MD5(A2))),$$

where IK is the AKA Integrity Key.

The methods disclosed herein are improvements over at least the proposal mentioned above related to the use of the Digest AKAv2, where it was proposed to change the manner in which the password in the Digest AKA is generated by including also the AKA session keys in the Digest procedure as the "password". The A1 value in the AKAv2 draft, noted as A1', is:

A1'=A1+IK+CK, and as a result

Digest=MD5(concat. (MD5(A1+IK+CK), nonce values, MD5(A2))).

There is a similar approach that adds session keys into cnounce (see RFC 2617). While this is not mentioned in Digest AKAv2, it is seen as an equally weak method as Digest AKAV2.

By contrasting the foregoing expression with the expression for A1' given above in the description of the second method of this invention, it can be noted that the approach of the AKAv2 draft is based on a simple aggregation of parameters, and it furthermore lacks an exhaustive security analysis. The HMAC-MD5-based methods disclosed above are clearly more appropriate solutions to the authentication problem, and in particular provide enhanced security to thwart MITM attackers.

Figure 2:
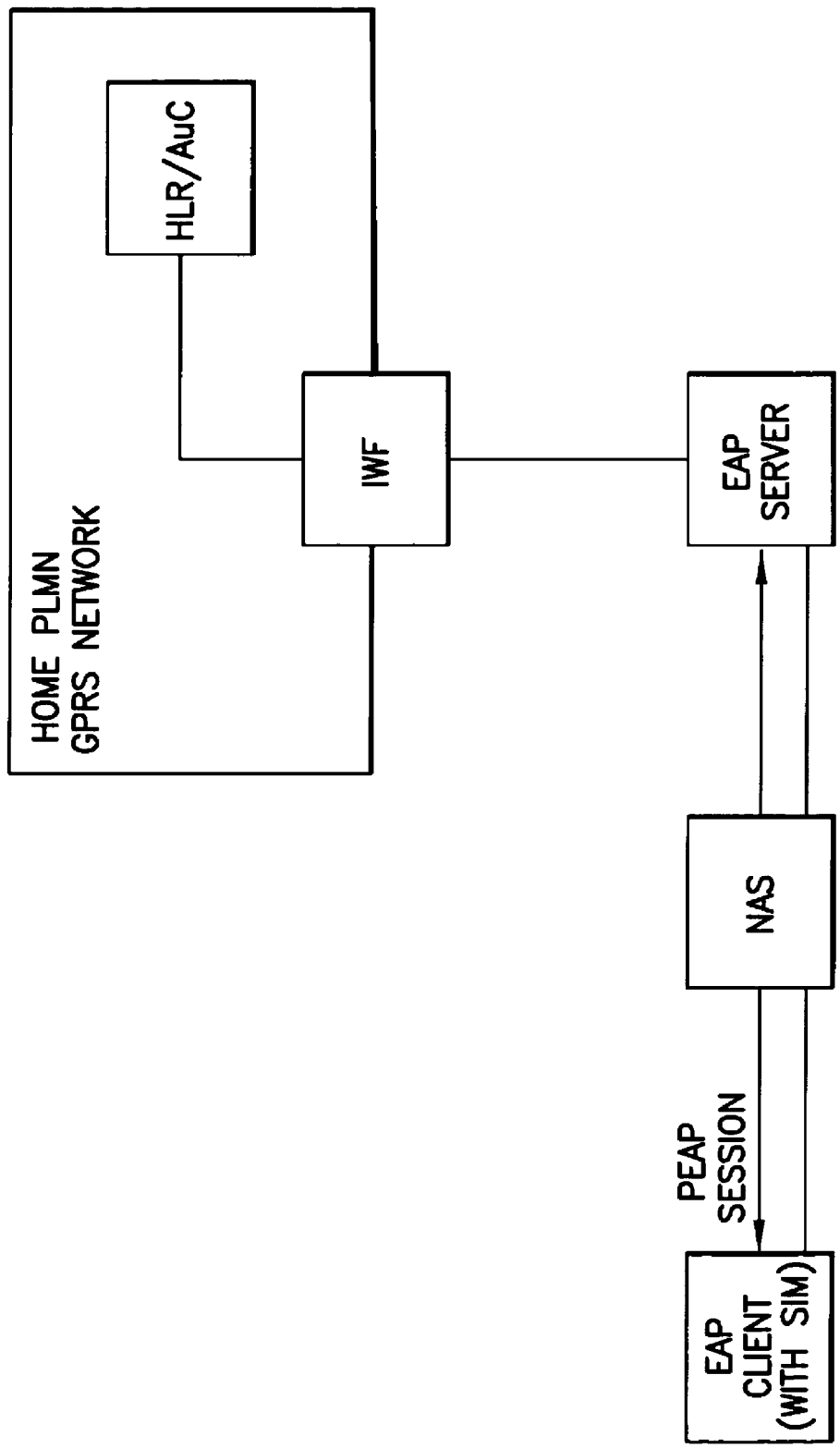
Figure 3:
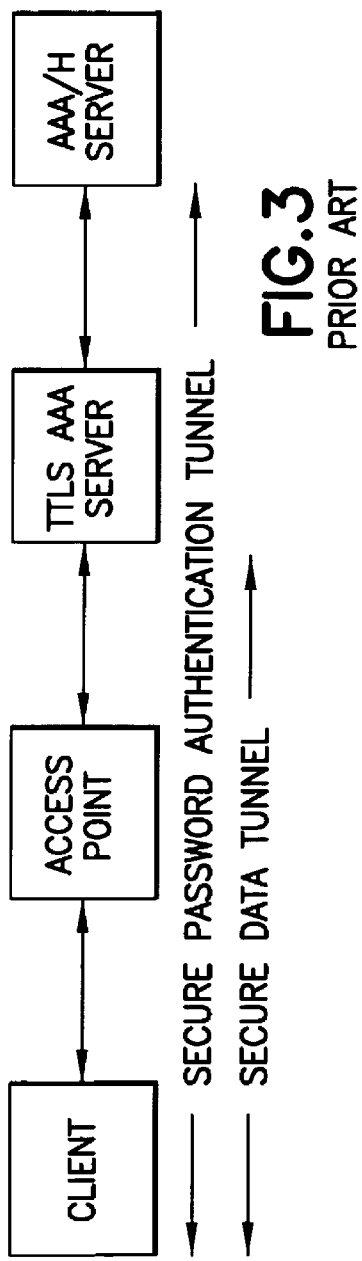
Figure 4:
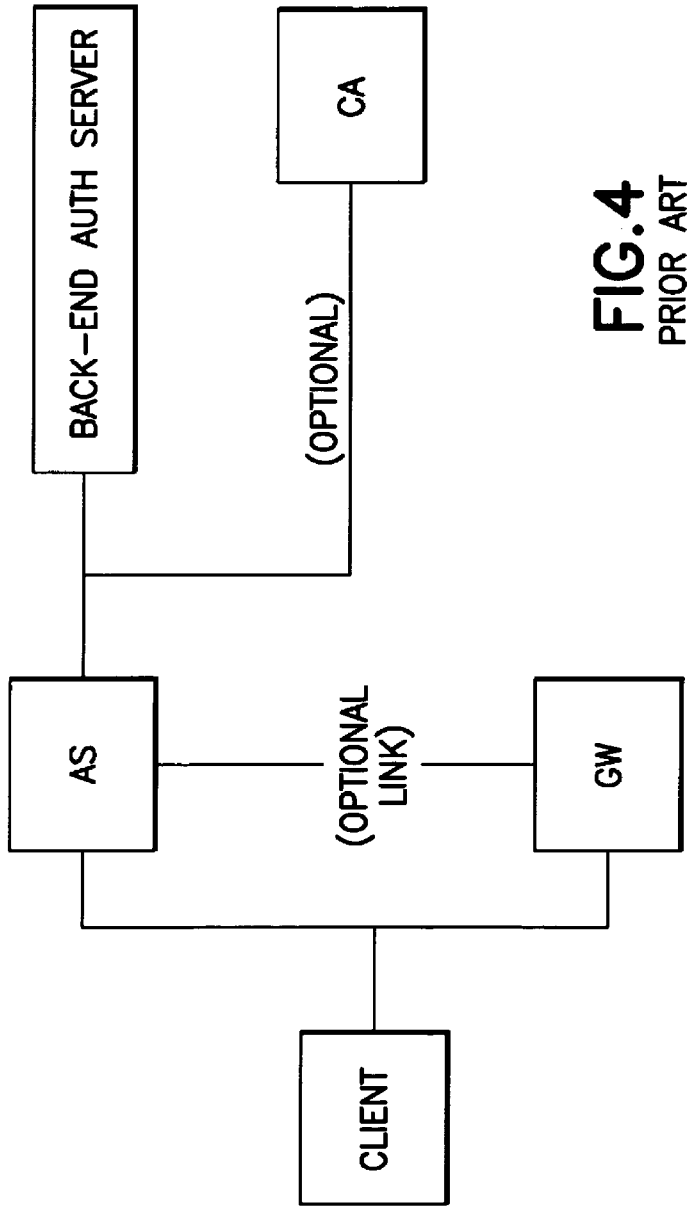
Figure 5:
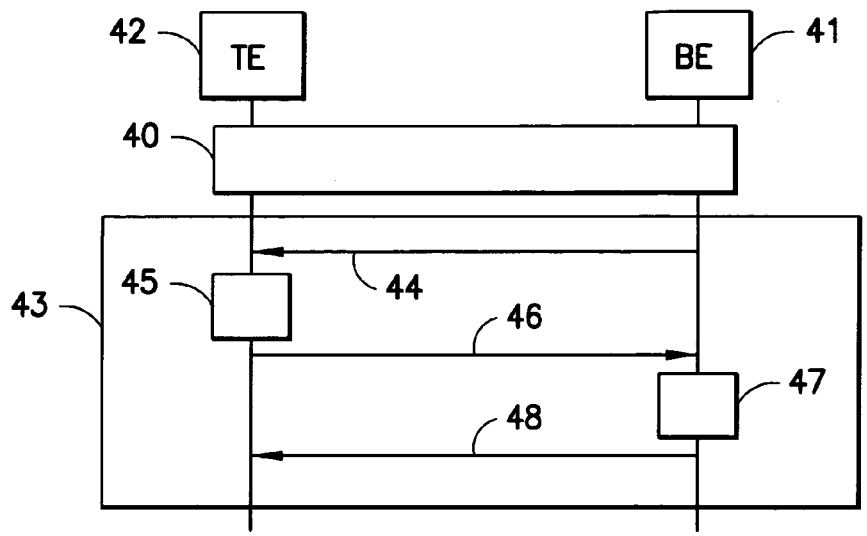
Figure 6:
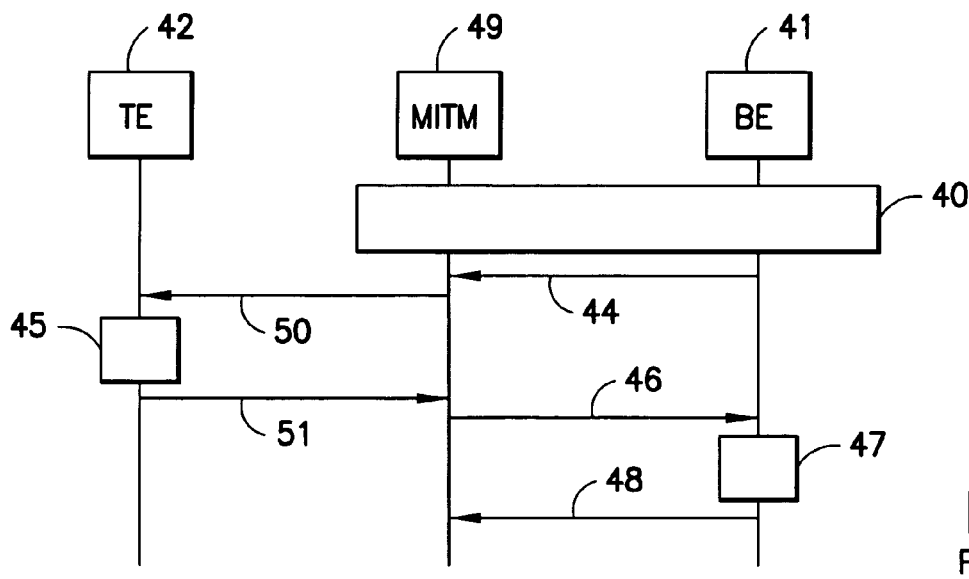

The overall signal flow may be based on FIG. 2 of RFC 3310, as modified in accordance with these teachings. When a client receives a Digest AKA authentication challenge, it extracts the RAND and AUTN from the "nonce" parameter, and assesses the AUTN token provided by the server. If the client successfully authenticates the server with the AUTN, and determines that the Sequence Number SQN used in generating the challenge is within expected range, the AKA algorithms are run with the RAND challenge and shared secret K. The resulting AKA RES parameter is treated as a "password" when calculating the response directive as defined in RFC 2617. In accordance with presently preferred embodiments of this invention the preferred Digest AKA hash algorithm is specified as described above, and the shared secret K and RAND are the input parameters used to generate IK or CK, e.g., IK=f(RAND,K), where f is a function.

One exemplary significant benefit of the two methods disclosed above is that the existing Digest AKA specification is not affected. By defining the new algorithm based on HMAC, the same base Digest AKA (i.e., AKAv1) can be used. In addition, it is not necessary to specify how AKA-produced keys are used to further strengthen the Digest credentials.

The presently preferred embodiments of this invention solve the various problems discussed above by utilizing the nature of AKA itself. Originally, AKAv1 defined the authentication response as:

Digest=MD5(concat. (MD5(A1), nonce values, MD5(A2))).

Since HTTP Digest AKAv1 uses RES as the Digestpassword, this allows an attack when HTTP Digest AKAv1 is used alone (i.e., without tunnel protection) to protect the integrity of data (i.e., using qop=auth-int to protect the body of a HTTP Request). This has been referred to an "interleaving attack" in the AKAv2 draft.

AKA is designed not only as an authentication protocol, but also for key agreement.

AKAv1 uses information from the authentication function only, while the session-specific information is actually available on both the client and server sides. For example, when AKAv1 is used in IMS (IP Multimedia Subsystem), the session key IK is used in IPsec to protect the Digest, so the binding is achieved perfectly. Since the session specific-data is available, it is used, in accordance with an aspect of this invention, also in the application layer (together with the authentication protocol) to verify the binding to the server, provided that transport layer protection is used.

This invention thus implements an improved security scheme by combining aspects of HMAC and the Digest AKA and MD5 specifications. In practice, the implementation of this invention implies the use of an additional MD5 calculation per hash, as well as the calculation of a pair of XORs of the key and the paddings ipad and opad (once these values are calculated, however, they can be reused throughout the Digest).

As was noted, a significant advantage of this invention, in comparison to the prior authentication proposals, is that the original Digest AKA specification need not be not affected. By defining a new Digest AKA algorithm based on HMAC, the same base Digest AKA (i.e., AKAv1) can still be used. In addition, it is not necessary to specify how AKA-produced keys are used to further strengthen the Digest credentials. HMAC is a known concept, is fully operational and well characterized, and has been used previously in several contexts.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent message formats and/or hash functions and the and the like may be attempted by those skilled in the art. However, all such and similar modifications of the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. A method comprising:
   selecting a hash message algorithm code message digest algorithm (HMAC-MD5) authentication and key agreement from a first hash message algorithm code message digest algorithm (HMAC-MD5) authentication and key agreement and a second hash message algorithm code message digest algorithm (HMAC-MD5) authentication and key agreement;
   directing a client to use a hash message algorithm code message digest algorithm keyed hash function based on the selected hash message algorithm code message digest algorithm (HMAC-MD5) authentication and key agreement when producing digest credentials, wherein the second hash message algorithm code message digest algorithm (HMAC-MD5) authentication and key agreement relates to using at least one of an authentication and key agreement integrity key (IK) and an authentication and key agreement cipher key (CK) in the hash message algorithm code message digest algorithm keyed hash function.

2. A method as in claim 1, where directing includes, in a digest authentication and key agreement (AKA) challenge sent to the client from the server, setting an "algorithm" field to 'algorithm="AKAv1-HMAC-MD5"'.

3. A method as in claim 1, where directing includes, in a digest authentication and key agreement (AKA) challenge sent to the client from the server, setting an "algorithm" field to 'algorithm="AKAv2-HMAC-MD5"'.

4. A method as in claim 1, where when using IK, the HMAC-MD5 hash for the digest AKA is as follows:
HMAC-MD5(data) =MD5(IK XOR opad, MD5(IK XOR ipad, data)), where ipad is an inner padding string that is repeated and opad is an outer padding string that is repeated.

5. A method as in claim 1, where when using CK, the HMAC-MD5 hash for the digest AKA is as follows:
HMAC-MD5(data) =MD5(CK XOR opad, MD5(CK XOR ipad, data)), where ipad is an inner padding string that is repeated and opad is an outer padding string that is repeated.

6. A method as in claim 1, where the digest is defined as follows:
digest =HMAC-MD5(concat.(HMAC-MD5(A1),nonces, HMAC-MD5(A2))).

7. An apparatus comprising:
a server configured to select a hash message algorithm code message digest algorithm (HMAC-MD5) authentication and key agreement from a first hash message algorithm code message digest algorithm (HMAC-MD5) authentication and key agreement and a second hash message algorithm code message digest algorithm (HMAC-MD5) authentication and key agreement, the server comprising a function to direct a client to use a hash message algorithm code message digest algorithm (HMAC-MD5) keyed hash function, based on the selected hash message algorithm code message digest algorithm (HMAC-MD5) authentication and key agreement when producing digest credentials, when producing digest credentials; and a function, in response to selection of the second hash message algorithm code message digest algorithm (HMAC-MD5) authentication and key agreement by said server, to use at least one of an authentication and key agreement integrity key (IK) and an authentication and key agreement cipher key (CK) in the keyed hash function, where MD5 is message digest algorithm 5.

8. An apparatus as in claim 7, where said server function, in a digest authentication and key agreement challenge sent to the client from the server, sets an "algorithm" field to 'algorithm="AKAv1-HMAC-MD5"'.

9. An apparatus as in claim 7, where said server function, in a digest authentication and key agreement challenge sent to the client from the server, sets an "algorithm" field to 'algorithm="AKAv2-HMAC-MD5"'.

10. An apparatus as in claim 7, where when using IK, a HMAC-MD5 hash for a digest authentication and key agreement is as follows:
HMAC-MD5(data) =MD5(IK XOR opad, MD5(IK XOR ipad, data)), where ipad is an inner padding string that is repeated and opad is an outer padding string that is repeated.

11. An apparatus as in claim 7, where when using CK, a HMAC-MD5 hash for a digest authentication and key agreement is as follows:
HMAC-MD5(data) =MD5(CK XOR opad, MD5(CK XOR ipad, data)), where ipad is an inner padding string that is repeated and opad is an outer padding string that is repeated.

12. An apparatus as in claim 7, where the digest is defined as follows:
digest =HMAC-MD5(concat.(HMAC-MD5(A1),nonces, HMAC-MD5(A2))).

13. An apparatus comprising:
user equipment configured to be authenticated by a digest authentication and key agreement authentication procedure by a function from a server to direct the user equipment to employ a hash message algorithm code message digest algorithm (HMAC-MD5) keyed hash function, corresponding to a hash message algorithm code message digest algorithm (HMAC-MD5) authentication and key agreement selected from a first hash message algorithm code message digest algorithm (HMAC-MD5) authentication and key agreement and a second hash message algorithm code message digest algorithm (HMAC-MD5) authentication and key agreement, when producing digest credentials; and said user equipment, for the second hash message algorithm code message digest algorithm authentication and key agreement, responsive to said server, using at least one of an authentication and key agreement integrity key (IK) or an authentication and key agreement cipher key (CK) in the keyed hash function.

14. An apparatus as in claim 13, where said server, in a digest authentication and key agreement challenge sent to the user equipment, sets an "algorithm" field to 'algorithm="AKAv1-HMAC-MD5"'.

15. An apparatus as in claim 13, where said server, in a digest authentication and key agreement challenge sent to the user equipment, sets an "algorithm" field to 'algorithm="AKAv2-HMAC-MD5"'.

16. An apparatus comprising:
a server configured to direct user equipment to use a digest authentication and key agreement authentication procedure, said server configured to select a hash message algorithm code message digest algorithm (HMAC-MD5) authentication and key agreement from a first hash message algorithm code message digest algorithm (HMAC-MD5) authentication and key agreement and a second hash message algorithm code message digest algorithm (HMAC-MD5) authentication and key agreement, said server comprising a function to direct the user equipment to employ a hash message algorithm code message digest algorithm (HMAC-MD5) keyed hash function corresponding to the selected hash message algorithm code message digest algorithm authentication and key agreement when producing digest credentials, wherein, when the second hash message algorithm code message digest algorithm (HMAC-MD5) authentication and key agreement is selected, the digest credentials are produced through the use of both an authentication and key agreement integrity key (IK) and an authentication and key agreement cipher key (CK).

17. An apparatus as in claim 16, where said server, in a digest authentication and key agreement challenge sent to the user equipment, sets an "algorithm" field to 'algorithm="AKAv1-HMAC-MD5"'.

18. An apparatus as in claim 16, where said server, in a digest authentication and key agreement challenge sent to the user equipment, sets an "algorithm" field to 'algorithm="AKAv2-HMAC-MD5"'.

19. An apparatus comprising:
user equipment configured to be directed by a server is a wireless communications system, the user equipment configured to be authenticated by a digest authentication and key agreement authentication procedure, said user equipment comprising a function that is responsive to receipt of a message from the server to employ a hash message algorithm code message digest algorithm (HMAC-MD5) keyed hash function, corresponding to a hash message algorithm code message digest algorithm (HMAC-MD5) authentication and key agreement selected from a first hash message algorithm code message digest algorithm (HMAC-MD5) authentication and key agreement and a second hash message algorithm code message digest algorithm (HMAC-MD5) authentication and key agreement, when producing digest credentials, wherein, when the second hash message algorithm code message digest algorithm (HMAC-MD5) authentication and key agreement is selected, the digest credentials are produced through the use of both an authentication and key agreement integrity key (IK) and an authentication and key agreement cipher key (CK).

20. An apparatus as in claim 19, responsive to a digest authentication and key agreement challenge received from the server having an "algorithm" field set to 'algorithm="AKAv1-HMAC-MD5"'.

21. An apparatus as in claim 19, responsive to a digest authentication and key agreement challenge received from the server having an "algorithm" field set to 'algorithm="AKAv2-HMAC-MD5"'.

* * * * *